United States Patent
Pike et al.

(10) Patent No.: US 6,214,945 B1
(45) Date of Patent: Apr. 10, 2001

(54) PROCESS FOR PRODUCING HIGH MOLECULAR WEIGHT MONOVINYLIDENE AROMATIC POLYMERS AND POLYMODAL COMPOSITIONS

(75) Inventors: William C. Pike; James M. Roe; Duane B. Priddy, all of Midland, MI (US); Jose M. Rego, Hulst (NL)

(73) Assignee: The Dow Chemical Company, Midland, MI (US)

( * ) Notice: Subject to any disclaimer, the term of this patent is extended or adjusted under 35 U.S.C. 154(b) by 0 days.

(21) Appl. No.: 09/549,324

(22) Filed: Apr. 13, 2000

Related U.S. Application Data

(60) Provisional application No. 60/132,968, filed on May 7, 1999.

(51) Int. Cl.[7] ................................................. C08F 12/04
(52) U.S. Cl. .......................... 526/78; 526/192; 526/193; 526/204; 526/216; 526/217; 526/220; 526/222; 526/224; 526/225; 526/236; 526/346
(58) Field of Search ............................... 526/78, 192, 193, 526/204, 216, 217, 220, 222, 224, 225, 236, 346

(56) References Cited

U.S. PATENT DOCUMENTS

| | | |
|---|---|---|
| 4,585,825 | 4/1986 | Wesselmann . |
| 5,115,055 | 5/1992 | Dais et al. . |
| 5,145,924 | 9/1992 | Shero et al. . |
| 5,948,874 * | 9/1999 | Pike et al. ................... 526/204 X |
| 5,990,255 * | 11/1999 | Priddy et al. ................ 326/204 X |
| 6,084,044 * | 7/2000 | Roe et al. .................... 526/346 X |

FOREIGN PATENT DOCUMENTS

| | | |
|---|---|---|
| 712870 | 5/1996 | (EP) . |
| WO 92/13904 | 8/1992 | (WO) . |
| WO 96/18663 | 6/1996 | (WO) . |

* cited by examiner

Primary Examiner—Fred Teskin

(57) ABSTRACT

The present invention is an improved process for producing high molecular weight monovinylidene aromatic polymers and polymodal compositions by free radical polymerization of a vinyl aromatic monomer in the presence of a vinyl acid, wherein the improvement comprises neutralizing the acid after production of the desired amount of high molecular weight monovinylidene aromatic polymer by adding a base.

11 Claims, No Drawings

PROCESS FOR PRODUCING HIGH MOLECULAR WEIGHT MONOVINYLIDENE AROMATIC POLYMERS AND POLYMODAL COMPOSITIONS

This application claims the benefit of U.S. Provisional Application Ser. No. 60/132,968, filed May 7, 1999.

BACKGROUND OF THE INVENTION

The present invention relates to a process for producing high molecular weight monovinylidene aromatic polymers and polymodal molecular weight monovinylidene aromatic polymer compositions.

High weight average molecular weight (Mw) monovinylidene aromatic polymers have been previously produced by free radical polymerization in the presence of a vinyl acid have a pKa of less than 2 as disclosed in U.S. Pat. No. 5,145,924, which is incorporated herein by reference and in U.S. Pat. Nos. 5,962,605 and 5,948,874. The free radical polymerization is typically conducted in the presence of an initiator. However, it is well known in the art that at some point during the polymerization, the initiator is expended and thermal polymerization occurs unless additional initiator is added. During thermal polymerization of vinyl aromatic monomer, conversion becomes difficult due to the presence of the acid and low Mw fractions are produced, as taught in *J. Phys. Org. Chem* (1995) 8, p. 301. Additionally, the presence of acid during thermal polymerization catalyzes the formation of 1-phenyltetralin, a by-product, as described in Polymer (1992) 33, p. 3055. At the high temperatures used to increase conversion in the absence of initiator, 1-phenyltetralin forms rapidly in the presence of acid and must be removed from the polymer composition.

Polymodal molecular weight monovinylidene aromatic polymer compositions, wherein the polymer composition comprises more than one distinct weight average molecular weight, have previously been produced in a number of ways including blending and in situ polymerization. Blending two polymers having different molecular weights offers a high degree of control, but is inefficient due to the addition of the compounding step. U.S. Pat. No. 4,585,825 discloses a bimodal composition, however, the high molecular weight polymer is produced at low temperatures and low conversion rates which require very long reaction times. U.S. Pat. Nos. 5,962,605, and 5,948,874, herein incorporated by reference, disclose bimodal compositions produced using free radical polymerization, characterized in that high molecular weight polymer is produced in the presence of a vinyl acid having a pKa of less than 2.0, and low molecular weight polymer is produced by adding initiator and chain transfer agent to the reaction mixture containing high molecular weight polymer. However, the presence of the vinyl acid retards the polymerization rate and continues to encourage high molecular weight polymer production, thus requiring large amounts of chain transfer agent in order to produce the low molecular weight polymer.

Therefore, it remains highly desirable to provide an improved process to produce high molecular weight monovinylidene aromatic polymers, which does not require additional initiators, and reduces by-product formation; and to provide an improved process to produce polymodal compositions comprising such high molecular weight polymers which does not require large amounts of chain transfer agent in order to make a low molecular weight polymer.

SUMMARY OF THE INVENTION

The present invention is an improved process for producing a high molecular weight monovinylidene aromatic polymer, wherein a vinyl aromatic monomer is free radically polymerized in the presence of a vinyl acid having a pKa at 25° C. of less than 2.0, wherein the improvement comprises: neutralizing the vinyl acid, after the production of the desired amount of high molecular weight polymer, with a sufficient amount of base such that substantially all of the acid is neutralized, and continuing the free radical polymerization in the absence of the vinyl acid, under conditions such that additional high molecular weight monovinylidene aromatic polymer is produced.

In another embodiment, the present invention is an improved process for producing polymodal molecular weight monovinylidene aromatic polymer compositions, wherein a vinyl aromatic monomer is free radically polymerized in the presence of a vinyl acid having a pKa at 25° C. of less than 2.0, to produce a high molecular weight monovinylidene aromatic polymer and low molecular weight monovinylidene aromatic polymer is produced in a subsequent step, wherein the improvement comprises:

neutralizing the vinyl acid, after the production of the desired amount of high molecular weight polymer, with a sufficient amount of base such that substantially all of the acid is neutralized, and continuing the free radical polymerization in the absence of the vinyl acid, under conditions such that a monovinylidene aromatic polymer having a low molecular weight is produced.

This process can produce high molecular weight monovinylidene polymers with increased conversion without by-product formation or significant low molecular weight fractions. It also offers better control of the polymer molecular weights within the polymodal composition and does not have the disadvantages of the prior art.

DETAILED DESCRIPTION OF THE INVENTION

Monovinylidene aromatic polymers can be produced by free radical polymerization of vinyl aromatic monomers. Vinyl aromatic monomers for use according to the present invention include, but are not limited to, those vinyl aromatic monomers previously known for use in polymerization processes, such as those exemplified in U.S. Pat. Nos. 4,666,987, 4,572,819 and 4,585,825. Preferably, the monomer is of the formula:

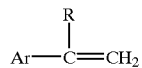

wherein R is hydrogen or methyl, Ar is phenyl, halophenyl, alkylphenyl or alkylhalophenyl, wherein any alkyl group contains 1 to 6 carbon atoms. The term halophenyl refers to a phenyl substituted with one or two halogen atoms, the term alkylphenyl refers to a phenyl substituted with one or two alkyl groups, and the term alkylhalophenyl refers to phenyl substituted with one or two alkyl groups which contain a halogen substituent or to a phenyl substituted with a halogen and an alkyl substituent. More preferably Ar is phenyl or alkylphenyl with phenyl being most preferred. In addition, the polymerization may be conducted in the presence of predissolved elastomer to prepare impact modified, or grafted rubber containing products, examples of which are described in U.S. Pat. Nos. 3,123,655, 3,346,520, 3,639,522, and 4,409,369.

The acid catalyst used in the process of the present invention may be any acid having a pKa at 25° C. of less than 2. The pKa is used to express the extent of dissociation of acids in water, and is the negative logarithm (to the base 10) of the equilibrium constant, Ka. Such acid catalysts include, but are not limited to, 2-sulfoethylmethacrylate (SEM), acrylamidopropane sulfonic acid (AMPS), 2-sulfopropylmethacrylate, methanesulfonic acid, camphorsulfonic acid, p-toluenesulfonic acid, phosphoric acid, sulfuric acid, or mixtures thereof. Preferably the acid catalyst is a vinyl functional sulfonic or vinyl functional phosphonic acid of the formulas:

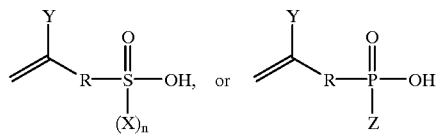

wherein X is O and n is either 0 or 1; Y is H, methyl or phenyl; Z is $C_1$–$C_6$ alkyl, aryl or O—Y; and R is —C(=O)CH$_2$CH(Y)—, —C(=O)NHCH$_2$CH(Y)—, phenyl or a direct bond. Examples of such acids include 2-sulfoethylmethacrylate (SEM), vinylphosphonic acid (VPA), 2-sulfopropyl-methacrylate (SPM), styrenesulfonic acid (SSA), styrene-phosphonic acid (SPA), 4-vinylbenzylphoshonic acid (VBPA), 2-sulfoethylacrylate (SEA), α-phenylvinylphosphonic acid (PVPA), or mixtures thereof, with the most preferred vinyl acid being SEM. These acids are known and are commercially available or can be made by processes as described in U.S. Pat. No. 4,529,559, which is incorporated herein by reference.

The acid catalyst can be dispersed in a (meth)acrylic acid or ester thereof, before combining with the vinyl aromatic monomer. The term (meth)acrylic acid refers to either a methacrylic acid or an acrylic acid. A (meth) acrylic acid ester would be any $C_1$–$C_8$ ester of methacrylic acid or acrylic acid. Accordingly, throughout the application, any teachings referring to (meth)acrylic acid can also be applied to an ester thereof. The (meth)acrylic acid acts as a reactive dispersant, copolymerizing into the vinyl aromatic polymer chain during polymerization such that it does not contaminate the polymer or the volatile recycle stream. The (meth) acrylic acid also serves as a buffer for very strong acid catalysts such that they can be added to styrene without initiating cationic polymerization. The acid catalyst generally comprises from 0.1 to 75 weight percent of the acid catalyst/(meth)-acrylic acid mixture, typically from 0.5, preferably from 1, more preferably from 5, and most preferably from 10 to 75, typically to 70, preferably to 65, more preferably to 60, and most preferably to 50 weight percent of the acid catalyst/(meth)-acrylic acid mixture.

The amount of acid catalyst/(meth)acrylic acid mixture present in the polymerization is dependent upon the concentration of the acid catalyst in the mixture. Typically, the acid catalyst is present in the polymerization in amounts such that a high molecular weight polymer is produced without appreciably adversely affecting the properties of the polymer. The amount of acid catalyst needed will depend upon the particular acid catalyst used. It has been found that good results are obtained when the ratio (pKa X acid catalyst molecular weight)/(concentration of the acid catalyst in ppm based on vinyl aromatic monomer) is from 0.01, more preferably from 0.05, most preferably from 0.08, to 1, more preferably to 0.5, and most preferably to 0.3. In the case of acid salts, this would be based on the pKa of the acid component of the salt. In general, acid catalysts of higher pKa values will be present in greater amounts than acid catalysts of lower pKa values. Generally, the acid catalyst will be present in an amount of from 1, typically from 5, preferably from 10, more preferably from 15 and most preferably from 25 ppm to 1000, typically to 950, preferably to 900, more preferably to 850 and most preferably to 800 ppm, based on the amount of vinyl aromatic monomer. Sulfur containing vinyl acids can be used in amounts which will produce a high molecular weight polymer without initiating cationic polymerization. If the amount of sulfur containing vinyl acid is too great, the acid will initiate cationic polymerization which will produce low molecular weight polymers, e.g. less than 20,000 Mw. Cationic polymerization can therefore be detected by the formation of low molecular weight fractions within the high molecular weight polymer produced. Typically, amounts of from about 1, preferably from about 5, more preferably from about 10, most preferably from about 15 to about 500 ppm, preferably to about 400, more preferably to about 300, and most preferably to about 100 ppm of a sulfur containing vinyl acid is present, based on the amount of vinyl aromatic monomer. Phosphorus containing vinyl acids may be present in larger amounts and are not known to initiate cationic polymerization. Typically, amounts of from about 500 to about 20,000 ppm of phosphorus containing vinyl acid is present, preferably from about 600 to about 15,000, more preferably from about 800 to about 10,000 and most preferably from about 1000 to about 5000 ppm based on the amount of vinyl aromatic monomer.

The free radical polymerization to produce high molecular weight monovinylidene aromatic polymer can optionally be conducted in the presence of a nitroxyl stable free radical compound as described in "Narrow Polydispersity Polystyrene by a Free-Radical Polymerization Process-Rate Enhancement", *Macromolecules* 1994, 27, pg. 7228–7229. Typical nitroxyl radical compounds include 2,2,6,6-tetramethyl-1-piperidinyloxy and 3-carboxy-2,2,5,5-tetramethyl-1-pyrrolidinyloxy. Typical amounts of nitroxyl stable free radical are from 10 ppm to 2000 ppm based on the amount of vinyl aromatic monomer.

A free radical initiator can be used in the free radical polymerization to produce the high molecular weight polymer. Typical initiators include azo compounds and peroxides. Exemplary peroxides include tert-butylperoxybenzoate, tert-butylperoxyoctoate, di-tert-butylperoxide, dibenzoylperoxide, dilauroylperoxide, 1,1-bis-tert-butylperoxycyclohexane, 1,1,-bis -tert-butylperoxy-3,3,5-trimethylcyclohexane and dicumylperoxide.

Additionally, a solvent may be used in the process of the present invention. Representative solvents include aromatic and substituted aromatic hydrocarbons such as benzene, ethylbenzene, toluene, xylene or the like; substituted or unsubstituted, straight or branched chain saturated aliphatics of 5 or more carbon atoms, such as heptane, hexane, octane or the like; alicyclic or substituted alicyclic hydrocarbons having 5 or 6 carbon atoms, such as cyclohexane; and the like. Preferred solvents include substituted aromatics, with ethylbenzene, toluene and xylene being most preferred. If employed, the solvent is generally employed in an amount of up to about 35 weight percent, preferably from about 2 to about 25 weight percent, based on the total weight of the solution.

The polymerization can be conducted at any temperature at which a high molecular weight polymer will be produced. Suitable polymerization temperatures are from about 80° C. to about 170° C., preferably from about 110° C. to about 160° C., with about 115° C. to about 150° C. being the most preferred.

Once the desired level of high molecular weight polymer is achieved, a base is added to the reaction mixture of high molecular weight monovinylidene aromatic polymer and unreacted monomer and other optional components. Typically, the base is added at a vinyl aromatic monomer conversion level of from about 20 to about 60 percent, preferably between about 25 and 55 and more preferably between about 30 and 50 percent.

Preferably, the base is a material which is easily dissolved in a vinyl aromatic monomer or organic solvent, or sufficiently dispersible and/or emulsifiable within a vinyl aromatic monomer such that acid neutralization can be achieved. Bases useful for the present invention, include any base which will neutralize the acid catalyst used. Typical bases include metal salts such as zinc stearate, calcium stearate, and sodium stearate, amines such as trioctylamine, imidazolenes such as laurylimidazolene, and ammonia.

The amount of base added is typically at least 1 molar equivalent to the amount of acid present in the polymerization. In other words, at least 1 mole of base is added for each mole of acid present. Generally, an excess is added in order to decrease the amount of time required for full neutralization. Preferably, at least 1.2 molar equivalents of base are added, more preferably at least 1.25 and most preferably at least 1.3 molar equivalents.

The base can be added in any form which will adequately neutralize the acid upon addition to the polymerization reaction. Typical forms include neat liquid, gas, hot melt, a solution in monovinylidene aromatic polymer or organic solvent, a slurry, dispersion or emulsion. In one embodiment the base is added as a slurry of base, monovinylidene aromatic polymer and solvent.

After addition of the base, the polymerization is continued thermally to produce additional high molecular weight monovinylidene aromatic polymer. The thermal polymerization is typically conducted at a higher temperature in order to increase the polymerization rate. Typically, the temperature for thermal polymerization will be between about 140 and 170° C. This process produces a monomodal high molecular weight monovinylidene aromatic polymer. Monomodal refers to the weight average molecular weight distribution of the polymer as having one distinct weight average molecular weight peak when evaluating different conversion fractions of the polymer produced, but does not necessarily refer to a polymer having a polydispersity of 1.

The Mw of the monomodal polymer will typically be from about 250,000 to about 400,000, preferably from about 250,000 to about 350,000, more preferably from about 250,000 to about 330,000 and most preferably from about 300,000 to about 330,000. The Mw defined within the present specification refers to a Mw measured using gel permeation chromatography (GPC).

In another aspect of the present invention, a low molecular weight monovinylidene aromatic polymer is produced after the high molecular weight polymer, in order to produce a polymodal composition. A polymodal composition refers to the weight average molecular weight distribution of the polymer as having more than one distinct weight average molecular weight peak when evaluating different conversion fractions of the polymer produced. In this process, base is added to the polymerization reaction once the desired level of high molecular weight monovinylidene aromatic polymer is produced. Typically, the base is added at a vinyl aromatic monomer conversion level of from about 20 to about 60 percent, preferably between about 25 and 55 and more preferably between about 30 and 50 percent. After acid neutralization, the polymerization is continued under conditions such that a low molecular weight polymer is produced. This can be accomplished by several methods known to those skilled in the art, including temperature control, and use of chain transfer agents and/or initiators.

If an initiator is utilized to produce the low molecular weight polymer, the initiator may be any initiator or mixture of initiators which will polymerize the unreacted monomer in the mixture containing the high molecular weight polymer. The initiator can be any free radical initiator as discussed previously, and is preferably a peroxide initiator such as tert-butylperoxybenzoate, tert-butylperoxyoctoate, di-tert-butylperoxide, dibenzoylperoxide, dilauroylperoxide, 1,1-bis-tert-butyl peroxycyclohexane, 1,1,-bis-tert-butylperoxy-3,3,5-trimethylcyclohexane and dicumylperoxide. Typical amounts of initiator are from 10 ppm to 2000 ppm based on the amount of vinyl aromatic monomer.

Optionally, chain transfer agents may be utilized in the preparation of the low molecular weight polymer. Suitable chain transfer agents include common chain transfer agents known in the art such as mercaptans. Preferably, the chain transfer agent is n-dodecylmercaptan or terpinoline. Typical amounts of chain transfer agents are from 10 ppm to 4000 ppm based on the amount of vinyl aromatic monomer.

The molecular weight of the high molecular weight polymer can be selected according to the desired Mw of the polymodal composition and is preferably from about 300,000 to about 2,000,000 more preferably from about 350,000 to about 1,500,000, and most preferably from about 400,000 to about 800,000.

The desired Mw of the low molecular weight polymer is also a matter of choice and is dependent upon the desired Mw of the bimodal composition and the desired properties. Preferably the Mw is from about 50,000 to about 200,000.

The amount of high molecular weight polymer present in the polymodal composition can be selected according to the desired properties of the polymodal composition. Typically, from 1 to 99 percent, preferably from 5 to 55 percent, and most preferably from 10 to 30 percent of the high molecular weight polymer is present.

The average Mw of polymodal compositions is dependent upon the Mw of the polymers contained within the composition. The average Mw of the bimodal composition of this embodiment of the present invention is preferably from about 120,000 to about 600,000, more preferably from about 130,000 to 500,000, and most preferably from about 140,000 to 400,000.

The composition containing both high and low molecular weight vinyl aromatic polymers may be any combination of two vinyl aromatic polymers but is preferably a blend of polymers having the same composition (i.e., homopolymers of the same monomeric units or copolymers having the same comonomeric units in the similar ratios). More preferably, both polymers are polystyrene.

A preferred process for the production of the bimodal composition is a continuous polymerization process wherein a group of several distinct reaction zones within one or more reactors are used in series to create the different molecular weight polymers. The different zones are maintained at the desired temperatures and supplied with the appropriate reactants necessary to produce the desired amounts of polymer having the specified molecular weights, such that polymodal compositions are produced.

In a preferred process, an earlier polymerization zone is maintained such that a high molecular weight polymer is produced, while a later zone receives the reaction mixture from the previous zone, including the high molecular weight polymer, and is supplied with the base to neutralize the acid. The later zone is optionally supplied with additional reactants, including an initiator and/or a chain transfer agent, and is otherwise maintained such that it produces a low molecular weight polymer in the presence of the previously produced high molecular weight polymer, a blend of the two components being achieved thereby. Usually, the earlier high molecular weight polymer-producing reactor or zone is at a lower temperature than the subsequent low molecular weight polymer producing reactor or zone.

Bimodal compositions containing high molecular weight and low molecular weight polymers are useful for a variety of applications including foam board, foam sheet, injection molding, and extrusion.

Other traditional polymer additives may also be included in the process of the present invention, including plasticizers and mold release agents.

The following examples are provided to illustrate the present invention. The examples are not intended to limit the scope of the present invention and they should not be so interpreted. Amounts are in weight parts or weight percentages unless otherwise indicated.

EXAMPLE 1

A 2.5 liter polymerization vessel equipped with an overhead stirrer, an addition vessel, and a nitrogen inlet is charged with 1425 grams of styrene monomer, 75 grams of ethyl benzene, and 0.0075 grams of a 50/50 mixture of sulfoethylmethacrylate(SEM)/methacrylic acid(MAA). The reactor is pressurized to 2–3 bar gauge and the following temperature profile is used for the polymerization:

| Temperature Zone | Temperature °C. | Time to reach temp. in each zone (hours) |
|---|---|---|
| I | 22–113 | 1.0 |
| II | 113–135 | 1.0 |
| III | 135–140 | 0.75 |
| IV | 140–145 | 0.75 |
| V | 145–150 | 0.75 |
| VI | 150–155 | 0.75 |

Samples are taken at 2, 4 and 5 hours and are measured for percent solids (conversion) and molecular weight using gel permeation chromatography (GPC).

Zinc stearate is added as a slurry of 9.5 weight percent polystyrene, 5 weight percent zinc stearate, and 85.5 weight percent ethyl benzene in an amount of 933 ppm zinc stearate based on the total weight of the reaction mixture in Runs 2–4. (An excess of zinc stearate is used due to its additional function as a mold release agent.)

Run 1 is completed without any addition of base to the polymerization reaction.

Run 2 is completed with the addition of zinc stearate to the original feed of reactants.

Run 3 is completed with the addition of zinc stearate after 2 hours of polymerization.

Run 4 is completed with the addition of zinc stearate after 2.5 hours of polymerization at a level of 100 ppm zinc stearate based on the total weight of the reaction mixture.

Run 5 is completed with the addition of trioctylamine after 2.5 hours of polymerization at a level of 550 ppm based on the total weight of the reaction mixture.

Run 6 is completed with the addition of lauryl imidazolene after 2.5 hours of polymerization at a level of 2000 ppm based on the total weight of the reaction mixture.

Run 7 is completed with the addition of a 0.5 % solution of ammonia in ethyl benzene after 2.5 hours of polymerization at a level of 25 ppm of ammonia based on the total weight of the reaction mixture.

The results are listed in Table II.

TABLE II

| RUN | TEMP (°C.) | Time (hours) | % SOLIDS | Mw |
|---|---|---|---|---|
| 1* | 137 | 2.2 | 23.8 | 377,800 |
|  | 148 | 4 | 54 | 420,300 |
|  | 156 | 5 | 62 | 397,400 |
| 2* | 138 | 2.45 | 30.5 | 296,100 |
|  | 147 | 3.73 | 55.7 | 281,800 |
|  | 155 | 5 | 73.5 | 263,800 |
| 3 | 136 | 2.33 | 20.7 | 441,900 |
|  | 145 | 3.42 | 43.8 | 354,600 |
|  | 154 | 4.83 | 66.7 | 311,400 |
| 4 | 114 | 2 | 5.7 | 615,500 |
|  | 149 | 4 | 50.9 | 345,800 |
|  | 156 | 5 | 71.3 | 311,500 |
| 5 | 136 | 2 | 12.04 | 540,200 |
|  | 150 | 4 | 54.89 | 346,100 |
|  | 155 | 5 | 72.71 | 305,800 |
| 6 | 136 | 2 | 11.89 | 482,400 |
|  | 150 | 4 | 54.59 | 350,100 |
|  | 155 | 5 | 74.45 | 304,200 |
| 7 | 131 | 2 | 17.86 | 432,700 |
|  | 147 | 4 | 58.00 | 299,500 |
|  | 141 | 5 | 72.15 | 280,700 |

*Comparative Examples

Run 1 is a comparative example to show a polymerization without neutralization of the vinyl acid wherein only high Mw polymer is obtained.

Run 2 is a comparative example to show the effect on Mw when the base is present from the start of the polymerization. High Mw polymer is not obtained.

Runs 3–7 are examples for producing bimodal Mw compositions by neutralizing the vinyl acid after high Mw polymer has been produced, and wherein low Mw polymer is subsequently produced.

What is claimed is:

1. An improved process for producing a high molecular weight monovinylidene aromatic polymer, wherein a vinyl aromatic monomer is free radically polymerized in the presence of a vinyl acid having a pKa at 25° C. of less than 2.0, wherein the improvement comprises:

neutralizing the vinyl acid, after the production of the desired amount of high molecular weight polymer, with a sufficient amount of base such that substantially all of the acid is neutralized, and continuing the free radical polymerization in the absence of the vinyl acid, under conditions such that additional high molecular weight monovinylidene aromatic polymer is produced.

2. An improved process for producing polymodal molecular weight monovinylidene aromatic polymer compositions, wherein a vinyl aromatic monomer is free radically polymerized in the presence of a vinyl acid having a pKa at 25° C. of less than 2.0, to produce a high molecular weight monovinylidene aromatic polymer and low molecular weight monovinylidene aromatic polymer is produced in a subsequent step, wherein the improvement comprises:

neutralizing the vinyl acid, after the production of the desired amount of high molecular weight polymer, with a sufficient amount of base such that substantially all of the acid is neutralized, and continuing the free radical polymerization in the absence of the vinyl acid under conditions such that monovinylidene aromatic polymer having a low molecular weight is produced.

3. The process of claim 1 or 2 wherein the vinyl acid is a vinyl functional sulfonic or vinyl functional phosphonic acid of the formula:

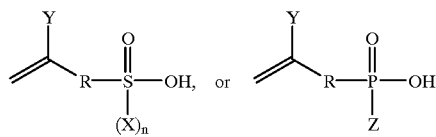

wherein X is O and n is either 0 or 1; Y is H, methyl or phenyl; Z is C1–C6 alkyl, aryl or O—Y; and R is —C(=O)OCH2CH(Y)—, —C(=O)NHCH2CH(Y)—, phenyl or a direct bond.

4. The process of claim 1 or 2 wherein the vinyl acid is 2-sulfoethylmethacrylate, acrylamidopropanesulfonic acid, 2-sulfopropylmethacrylate, styrenesulfonic acid, or 2-sulfatoethylmethacrylate.

5. The process of claim 1 or 2 wherein the vinyl aromatic monomer is styrene.

6. The process of claim 1 or 2 wherein the base is selected from the group consisting of zinc stearate, calcium stearate, sodium stearate, trioctylamine, laurylimidazolene, and ammonia.

7. The process of claim 1 or 2 wherein the base is added in an amount of at least 1 molar equivalent to the amount of acid.

8. The process of claim 2 wherein the high molecular weight vinyl aromatic polymer and the low molecular weight vinyl aromatic polymer are both polystyrene.

9. The process of claim 8 wherein the high molecular weight polystyrene has a Mw of about 500,000 to about 2,000,000 and the low molecular weight polystyrene has a Mw of about 50,000 to about 200,000.

10. The process of claim 2 wherein the low Mw polymer is produced in the presence of a chain transfer agent.

11. The process of claim 10 wherein the chain transfer agent is n-dodecylmercaptan.

* * * * *